July 17, 1956  R. J. KUTZLER  2,755,426
AUTOMATIC STEERING APPARATUS
Filed Nov. 10, 1950
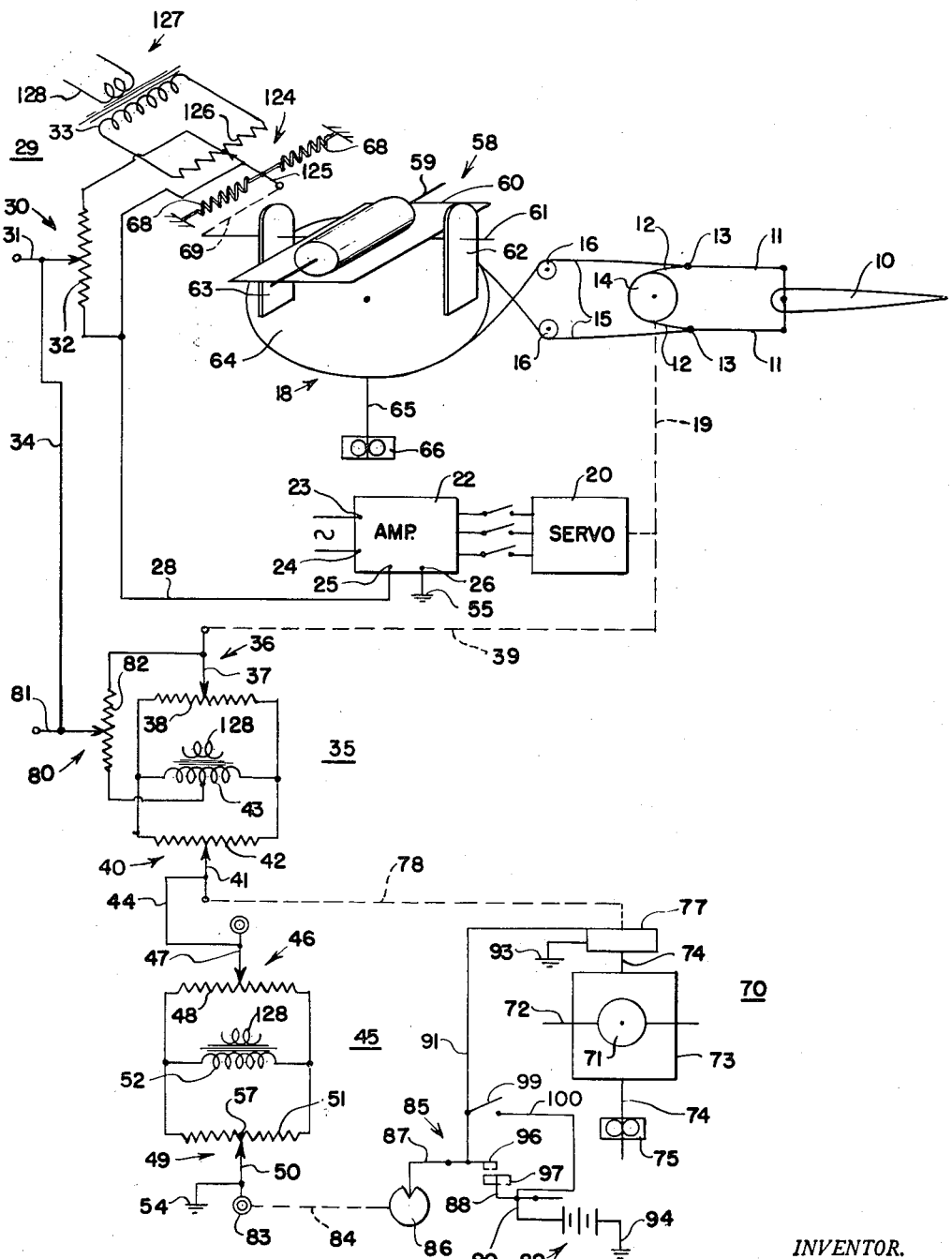
INVENTOR.
ROBERT J. KUTZLER
BY
George H Fisher
ATTORNEY.

United States Patent Office 2,755,426
Patented July 17, 1956

2,755,426

AUTOMATIC STEERING APPARATUS

Robert J. Kutzler, Minneapolis, Minn., assignor to Minneapolis-Honeywell Regulator Company, Minneapolis, Minn., a corporation of Delaware Application November 10, 1950, Serial No. 195,047

8 Claims. (Cl. 318—489)

This invention pertains to automatic steering apparatus for aircraft or other dirigible craft. In such apparatus a direction maintaining or position maintaining device which is responsive to the magnitude of change in the angular position of the aircraft about an axis is utilized as a controlling member. This member operates through the steering apparatus to control the positioning of a control surface for stabilizing the attitude of the aircraft with respect to said axis of rotation. Such apparatus may be further provided with a device which may provide an additional control in accordance with the rate of change of direction or rate of change of attitude of said craft about said axis. This rate effect tends to remove the hunt which would otherwise occur if control were merely derived from a displacement control as from the position maintaining device.

For the purpose of improving the anti-hunt qualities of the apparatus, this invention additionally provides for the control of a motor means for operating the control surface not only in accordance with the amount of angular movement of the aircraft about its axis and the rate of movement of said aircraft about its axis but also in accordance with the rate of movement of the motor means that operates the surface. To provide for the conventional proportional or telemetric movement of the motor means a repeat back from the motor means is also utilized to control its movement.

It is thus an object of this invention to control or operate the motor means which positions an aircraft control surface in accordance with the rate of angular departure of said craft about an axis and also in accordance with the rate of movement of said motor means.

The rate of angular movement of the aircraft about an axis may be derived from a rate gyroscope. The rate of angular movement of any rotating member may be obtained from a rate gyroscope. It is a further object of this invention therefore to obtain a measure of the rate of movement of a rotatable motor means by causing a rate gyroscope to precess in accordance with the angular rate of movement thereof.

It is a further object of this invention to use a common device, namely a rate gyroscope, for providing a control proportional to the rate of angular movement of the aircraft about an axis and also proportional to the rate of angular movement of the motor means that positions the control surface.

A further object of this invention is to provide an automatic steering apparatus in which a direction sensitive instrument stabilizes the heading of a craft, by means of a servomotor apparatus, without hunt about said heading with said servo apparatus itself operating without hunt.

The above and further objects of the invention will be evident upon consideration of the following description taken in conjunction with the drawing illustrating a preferred embodiment thereof. While for purposes of illustrating the invention it has been associated with control of heading of an aircraft, it will be readily perceived that in the case of aircraft the invention is equally applicable to control the aircraft about its roll axis or its transverse axis by operating the ailerons in one case and the elevator in the other.

The sole figure comprising the drawing is a schematic embodiment of the invention for controlling the rudder of an aircraft by heading stabilizing means.

In the drawing, the control surface 10 which is the rudder of the aircraft is operated by means of main cables 11. These main rudder cables 11 may be conventionally operated from the rudder bar (not shown) whereby manual positioning of the rudder 10 is effected. The main cables 11 are secured to motor driven cables 12 by any suitable fastening means 13. The cable 12 extends from a servomotor drum 14. Also operated with the cables 12 are additional motor driven cables 15 for rotating a turn table 18 upon operation of the cable drum 14. The purpose in rotating the turn table 18 will be more fully described subsequently.

The cable drum 14 is automatically positioned from an output shaft 19 of a servomotor 20. The servomotor 20 is automatically controlled to maintain the craft on a selected heading in one instance or to change the heading of the craft in another. The servomotor 20 is reversibly controlled from an amplifier 22 through three conductors each including a single pole single throw switch. The amplifier 22 is of the alternating current phase sensitive type. The output of the amplifier varies in phase in accordance with the relative phase of the alternating current from a supply source with respect to the phase of an alternating current control signal. The amplifier-servomotor combination may be similar to that disclosed in the United States patent to W. H. Gille et al. 2,425,734.

The amplifier 22 has power input terminals 23, 24; and signal input terminals 25, 26. The terminals 23, 24 are connected to a source of alternating current such as the ship's supply. The amplifier signal input terminals 25, 26 are connected to a balanceable control network which includes various control voltage generating means. The network comprises conductor 28, rate network 29, conductor 34, displacement network 35, conductor 44, manual network 45, conductor 54, to ground and to amplifier ground lead 55.

The rate network 29 includes a rate of turn voltage potentiometer 124 having a slider 125 and a resistor 126, a rate ratio potentiometer 30 having a slider 31 and a resistor 32, and a transformer 127 having a primary winding 128 and a secondary winding 33. Resistor 126 of the rate potentiometer 124 is connected across the secondary winding 33. The resistor 32 of the ratio potentiometer is connected across the center tap of resistor 126 and slider 125. The slider 31 of the ratio potentiometer 30 is manually adjusted.

The slider 125 of the rate potentiometer 124 is positioned from a rate of turn gyroscope 58 mounted on turn table 18. The rate of turn gyroscope 58 conventionally includes a rotor which is supported in a gimbal ring 60 for rotation about a horizontal axis 59. The gimbal ring 60 in turn is supported upon a horizontal axis 61 which is at right angles to the spin axis 59. The axis 61 is the precession axis of the gyroscope. Precession about the axis 61 is restrained by spring means 68 secured to slider 125, the driving connection between the axis 61 and slider 125 being effected by operating means 69 which is of any available type to cause movement of slider 125 along resistor 126 as a result of rotation of gimbal ring 60 about axis 61. The axis 61 is supported on pedestal blocks 62, 63 fixed to table 64 of turn table 18. The table 64 is supported from a shaft 65 which is rotatably supported in bearing 66.

The arrangement of the turn table 18 and the rate gyroscope 58 is such that upon movement of the aircraft about its turn axis the gyroscope rotor will precess about axis 61 and being restrained by spring means 68 will attain a position proportional to the rate of turn of the aircraft. Additionally, the turn table 18 is driven by cables 15 to also cause precession of the gyroscope 58 in accordance with the rate of movement of the cables 15 and therefore the rate of movement of the cable drum 14 from which the cables extend.

Continuing with the amplifier input balanceable network, conductor 28 extends from amplifier terminal 25 to slider 125 of the rate potentiometer. Network 35 of the amplifier input network includes a follow-up or repeat back potentiometer 36 having a slider 37 and a resistor 38; a directional gyro potentiometer 40 having a slider 41 and a resistor 42; a servo balance ratio potentiometer 80 having a slider 81 and a resistor 82; and secondary winding 43 of transformer 127 having a primary winding 128. Since the same primary winding may supply a plurality of secondary windings, the transformer 127 while including a single primary winding 128 includes a plurality of secondary windings each of which supplies one of the various networks. In order to simplify the connections, the secondary windings have been shown in association with the various networks, the primary winding 128 being shown each time that a secondary winding is shown.

The slider 37 is positioned from the servomotor 20 through repeat back connection 39. Resistor 38 is connected across the secondary winding 43. The resistor 42 of potentiometer 40 is connected across the secondary winding 43 in parallel with resistor 38 of potentiometer 36. The slider 41 of potentiometer 40 is positioned in accordance with the magnitude and direction of change in heading of the aircraft through an operating connection 78 from a direction sensitive instrument 70 which may be a directional gyroscope.

The gyroscope 70 includes a rotor casing 71 mounted for pivotal movement about an axis 72 which is horizontal and at right angles to the horizontal spin axis of the rotor within casing 71. The pivotal support about axis 72 is provided by an outer gimbal ring 73. The gimbal ring 73 in turn is trunnioned about a vertical axis 74 by means of bearings 75, only one of which is shown. Between the upper trunnion 74 and the potentiometer slider operating connection 78 is a device 77 for disabling the gyroscope 70 from the connection 78. The disabling means 77 could be constituted by a simple magnetic clutch which may be deenergized to permit relative movement of trunnion 74 and connection 78 but for purposes of disclosure may be considered as comprising a directional gyroscope arm lock. This directional arm lock upon energization prevents the transmission of movement of trunnion 74 to operating connection 78 by holding the latter element against movement, relative rotation of the two parts being permitted by a friction clutch therebetween. The arrangement is more fully disclosed in the application of Willis H. Gille No. 447,989, filed June 22, 1942. The servo balance ratio potentiometer resistor 82 is connected across the slider 37 of potentiometer 36 and a center tap of secondary winding 43. The tap 81 is manually adjusted. Conductor 34 extends from slider 31 of the rate ratio potentiometer 30 to the slider 81 of the servo balance ratio potentiometer 80.

The manual network 45 includes a manual trim potentiometer 46 having a slider 47 and a resistor 48; a secondary winding 52 of transformer 127; and a turn control potentiometer 49 having a slider 50 and a resistor 51. Resistor 48 is connected across the secondary winding 52. Slider 47 is manually adjusted along resistor 48. Resistor 51 is connected across the secondary winding 52 in parallel with resistor 48. Slider 50 is manually adjusted from a manual turn control knob 83. A conductor 44 extends from slider 41 of the displacement potentiometer 40 to slider 47 of the trim potentiometer 46. A conductor 54 extends from slider 50 of the turn control potentiometer 49 to ground which is common to the ground of amplifier conductor 55.

Upon adjustment of the turn control knob 83 to move slider 50, movement is also applied through an operating connection 84 to a cam operated switch 85 to effect energization of the directional arm lock 77. The switch 85 includes a cam member 86 having a radially depressed portion which is normally engaged by a cam follower end of a switch actuating lever 87. The opposite end of lever 87 carries a contact 96 which engages with an opposed contact 97 on a second switch lever 88. The lever 88 is connected by lead 90 to a battery 89. Upon rotation of the turn control knob in either direction, the follower portion of lever 87 rides out of the depressed portion of cam 86 to cause the switch lever arms 87 and 88 to engage their contacts 96, 97 to thus close a circuit from battery 89, conductor 90, closed contacts 96, 97, conductor 91, directional arm lock 77, conductor 93 to ground and to battery ground conductor 94. Thus, with the operation of the trim control knob 83 the directional arm lock is energized to disable the directional gyroscope 70 from operating the slider 41 of the displacement potentiometer 40. The gyroscope may also be caged by closing a manually operable switch 99 to complete a caging circuit from energized lead 100.

*Operation*

The operation may be considered in three stages. In the first stage, the network with its control devices is trimmed to the attitude of the craft. In this stage, the switch 99 is closed initially whereby the directional arm lock 77 is energized so that the craft may have its heading changed without communicating movement to slider 41 from directional gyroscope 70. The single throw switches between servomotor 20 and amplifier 22 are opened. The pilot may now manually position the rudder 10 through the main cables 11 to set a course of the craft relative to the direction maintaining instrument 70. If necessary, slider 47 may be adjusted to balance the amplifier input network. With the craft on the course as set, the switch is moved to open position to deenergize the directional arm lock 77. The single throw switches between the servomotor and amplifier 22 are closed.

A second stage or automatic stabilization may now be exercised. It is assumed that the sliders 50 and 47 of the manual network 45 are at the electrical centers of their resistors and therefore there is no potential difference between sliders 47 and 50. Furthermore, in the network 35, the gyro operated slider 41 and the motor position repeat back slider 37 are assumed in the centers of their respective resistors and therefore they are at the same potential. In the rate network 29 the slider 125 is assumed at the center of resistor 126. The network connected to the input control terminals 25, 26 of amplifier 22 is therefore in a balanced condition and the amplifier is in a quiescent state wherein the servomotor 20 is at rest.

Upon deviation in heading of the aircraft due to some transient disturbance, the position maintaining means 70 adjusts the slider 41 of the displacement potentiometer 40. At the same time, the rate of turn gyroscope 58 responds to the angular movement of the aircraft during its change of heading and adjusts the slider 125 with respect to the center of resistor 126. Network 35 therefore supplies a displacement signal voltage measured between sliders 41 and 37 and network 29 supplies a rate signal measured between slider 125 and the center of resistor 126. The amount of the rate signal obtained from potentiometer 124 and utilized in the balanceable network depends upon the adjustment of slider 31 of ratio rate potentiometer 30. The output of the rate network 29 is seen as the voltage between conductor 28 and slider 31. The displacement signal is seen as the difference of potential between slider 41 and the center tap of secondary winding 43 which at this time is at the same potential as slider 37. The displacement signal and the rate signal as thus generated in the potentiometers 40 and 124 are added and applied to the amplifier 22.

The amplifier 22 causes the servomotor 20 to rotate in a direction depending upon the direction of change of heading of the craft. The servomotor 20 positions the rudder 10 to correct for the change of heading and simultaneously through the repeat back connection 39 positions the slider 37 of the follow-up potentiometer 36. In addition, the servomotor 20 through the cable drum 14 rotates the turn table 18 which supports the rate gyroscope 58. The gyroscope 58 precesses due to this rotation and adjusts the slider 125 of the rate potentiometer 124 in the opposite direction to that in which it was moved by reason of turning of the plane.

The signals from the potentiometer 36 and from the rate potentiometer 124 due to operation of the servomotor 20 oppose the original signals arising from the change in heading of the aircraft from the transient disturbance. The amount of signal utilized from the potentiometer 36 depends upon the adjustment of the tap 81 of the servo balance ratio potentiometer 80 and the magnitude of the selected voltage is seen as between slider 81 and the center tap of secondary winding 43. The servomotor 20 continues to rotate until the network is in a balanced condition when no resultant signal is applied to the amplifier 22 and the servomotor 20 ceases operation. Since the amount of rotation taking place before the amplifier input circuit is balanced, the extent of rudder displacement for a given input signal to the amplifier may be varied. This variation of the rudder displacement may thus be considered a gain control as it varies the amount of output for a given input.

It is to be noted that the direction of rotation of the cable drum 14 is opposite to that of the turn table 18 and this reverse drive is effected by crossing the cables 15 which lead to the guide pulleys 16. Thus if the craft deviates to the left, the rate gyroscope 58 in response to this change in heading, operates the slider 25 to provide a signal tending to put in right rudder to correct for this change in heading. Upon movement of the cable drum 14 to position the rudder 10 the turn table 18 is rotated in a clockwise direction in the figure so that the rate gyroscope 58 will precess in an opposite direction. The rudder is thus controlled to stabilize the craft on a selected heading.

The third stage of operation occurs when it is desired to set a course relative to the directional gyroscope through the automatic pilot. In this procedure, the turn control knob 83 is adjusted in the direction in which it is desired to turn the aircraft to provide a signal from the turn potentiometer 49. With the adjustment of slider 50 of potentiometer 49 the switch 85 is closed to energize the directional arm lock 77 which results in isolating the gyroscope 70 from the operating connection 78. The signal from the turn control potentiometer 49 unbalances the network and causes the amplifier 22 to operate. This results in the operation of servomotor 20 to position the rudder 10. Operation of servomotor 10 supplies additional signals to said network through its follow back potentiometer 36 and the rate potentiometer 124, with the rate signal and the signal from the repeat back potentiometer 36 opposing the turn control signal. The signal from the turn control potentiometer 49 is thus opposed by the rebalancing signal potentiometer 36 and the signal from rate potentiometer 124 due to rotation of servomotor 20. As the craft turns, the resulting action on the rate gyroscope 58 produces an effect on potentiometer 124 that additionally opposes the turn control signal.

Upon return of the control knob 83 toward normal position, the servomotor 20 rotates in the direction to move the rudder toward its normal position with the network again in balanced condition when the new heading has been attained.

The function of the potentiometer 46 will be clarified. During the first stage, with switch 99 closed to energize the directional arm lock 77 the control surface 10 is manually operated by cables 11 to select a heading after which it is moved until it is in a normal streamlined position. At this time, the control network for amplifier 22 should be in a balanced condition. If the network is unbalanced at this time, the slider 47 of potentiometer 46 is adjusted until balance is obtained at which time the switch 99 may be returned to open position whereupon the directional arm lock 77 will be deenergized. The arrangement is now in condition for stabilized flight with the network in a balanced condition but unbalanced upon departure of the craft from the heading stabilized by the gyroscope 70.

The arrangement has application other than a control apparatus for an aircraft. In such other application, the gyroscope 58 need be made responsive only to the rotation of servomotor 20. This arrangement would comprise a simple proportioning system having an operation initiating controller (potentiometer 40), a follow-up controller (potentiometer 36) driven from servomotor 20 and controller (potentiometer 124) which supplies a signal due to the precession of gyroscope 58. Gyroscope 58 will precess to an extent depending upon the speed of rotation of servomotor shaft 19. The signal fed back from potentiometer 124 into the proportioning system is thus proportional to the rate of rotation of servomotor 20 and thus may be considered a velocity signal proportional to motor speed. It is old in the art, for example see the patent to Riggs 2,115,086, to utilize a velocity signal in a proportioning system to damp the tendency of the servomotor to oscillate. In the Riggs arrangement referred to, the velocity signal is obtained from what is known as a dynamic transformer which is wholly unlike the applicant's arrangement for obtaining a velocity signal. Thus the applicant provides the control device (potentiometer 40), the control device (potentiometer 36), and a rate device (potentiometer 124) driven from a rate gyroscope all in the same input circuit for the amplifier 22, with the gyroscope precessed by the motor controlled by the amplifier.

It will now be apparent that there has been provided an automatic steering apparatus for a craft wherein a rate signal from a rate responsive device coacts with a displacement signal to effect stabilization of said craft upon a given heading without appreciable hunting of the craft about said heading, and further wherein said rate responsive device is positioned by said motor which operates a control surface to effect stabilization and wherein the rate responsive device as thus driven provides a control effect on said motor which opposes further rotation of said motor. The driven rate responsive device thus functions as an anti-hunt means for said craft with respect to a heading to be maintained and also an anti-hunt means for a motor that controls the position of a control surface of said craft.

I claim as my invention:

1. Steering apparatus for a dirigible craft having a control surface displaceable from a normal position for positioning said craft about an axis, said apparatus comprising: motor means for operating said surface; a balanceable voltage network control means having a plurality of voltage producers connected to produce a resultant voltage for controlling said motor means; a craft heading responsive means adjusted in accordance with the magnitude of change in heading; a rate of turn gyroscope supported on a base rotatable with respect to said craft about a vertical axis so that said gyroscope precesses on turn of the craft about its said axis and also precesses on rotation of said base relative to said craft; means for adjusting one signal producer of said control means from said craft heading responsive means, means for adjusting a second voltage producer from said rate of turn gyroscope, and means for adjusting a third voltage producer from said motor means; whereby said craft may be maintained on a selected heading; and means for rotating said base from said motor means, whereby said rate of turn gyroscope is further influenced by the rate of rotation of said motor means.

2. Steering apparatus for a dirigible craft having a control surface for altering the position of the craft about its turn axis, said apparatus comprising: motor means for operating said control surface; a balanceable electrical network comprising a plurality of series connected potentiometers for reversibly controlling said motor means in accordance with the unbalance thereof; means for operating one potentiometer for adjusting the balance of said network in accordance with the magnitude of turn or change in heading of said craft; means for operating a second potentiometer for adjusting the balance of said network in accordance with the extent of operation of said motor means; and further means for operating a third potentiometer for adjusting the balance of said network in accordance with the rate of turn of the craft about its said axis and the rate of operation of said motor means, whereby said motor means is controlled by two displacement and two rate of turn movements so that said craft is automatically stabilized on a given heading.

3. Steering apparatus for a dirigible craft having a control surface displaceable from a normal position for controlling the heading of said craft, said apparatus comprising: motor means for operating said control surface; control means for reversibly operating said motor means; a plurality of signal voltage generators and voltage combining means therefor connected to said control means for operating said control means; means for operating one signal voltage generator in accordance with the magnitude of change in heading of said craft; means for operating a second signal voltage generator in accordance with the rate of change of heading of said craft and the rate of operation of said motor means; and means for operating a third signal voltage generator in accordance with the extent of movement of said motor means.

4. Control apparatus for an aircraft having a control surface for positioning said craft about an axis, said apparatus comprising: motor means for operating said control surface; position maintaining means variably responsive to the magnitude in change in angular position of said aircraft about said axis; means for generating a variable signal voltage in accordance with the operation of said position maintaining means; repeat back means for generating a variable signal voltage in accordance with the extent of movement of said motor means; a rate responsive device for generating a variable signal voltage in accordance with the rate of change of angular position of said craft about said axis and the rate of movement of said motor means; signal voltage combining means connected to said generators; and means controlled by said combining means for reversibly operating said motor means.

5. Control apparatus for an aircraft having a displaceable control surface for positioning said craft about an axis, said apparatus comprising: motor means for actuating said control surface; control means comprising an amplifier having input terminals connected to a balanceable voltage network and operating said motor means on unbalance thereof; a first signal voltage generator, including a device responsive to the rate of turn of the craft about said axis, for providing a signal voltage of a phase and magnitude proportional to the direction and rate of turn magnitude of said craft; a follow-up second voltage signal generator driven by said motor for providing a signal in proportion to the extent of operation of said motor; mechanical operating connections from said motor means to said device to effect an opposite response thereof to that occasioned by the turning of the craft; and means for connecting both of said signal voltage generators in said voltage network to stabilize the flight of said craft.

6. Control apparatus for a dirigible craft having a control surface displaceable from a normal position for positioning said craft about its turn axis, said apparatus comprising: motor means positioning said surface; a balanceable voltage electrical network connected to said motor means for controlling the direction of rotation of said motor means in accordance with the unbalance of said network; a rate of turn gyroscope, said gyroscope precessing about an axis perpendicular to the turn axis of said craft an extent dependent on the difference of the rate of change in heading of said aircraft and the rate of operation of said motor means; and variable magnitude signal voltage providing means for altering the balance of said voltage network and positioned by said gyroscope and by said motor means.

7. Control apparatus for an aircraft comprising: a support adapted to be rotatably mounted in an aircraft on an axis codirectional with a vertical axis of the craft for rotation about the craft vertical axis with said aircraft and also rotatable about its said axis relative to said aircraft; a rate of turn responsive gyroscope mounted on said support to precess with restraint about an axis perpendicular to the axis of rotation of said support; further means providing a signal proportional to a desired change in heading; motor means adapted to control the rotation of the craft about the vertical axis; operating means from said motor means to said rotatable support for said gyroscope; and variable magnitude voltage providing means for controlling the extent of operation of said motor means and positioned by said further means and by said gyroscope on precession thereof upon rotation of said gyroscope with said craft about said vertical axis due to change in the position of the craft about the vertical axis and the rotation of the gyroscope and support relative to the craft due to the operation of said motor means.

8. Control apparatus having a condition controlling device, said apparatus comprising: servomotor means operating said device for controlling the condition; means adjusted in accordance with the amount of change in said condition; means adjusted in accordance with the extent of movement of said motor means; means connected to both adjusted means for deriving a control voltage variable in magnitude in accordance with the relative magnitude of the adjustments of both adjusted means; further means responsive to the rate of change of said condition; additional means including said further means responsive to the rate of movement of said motor means; means for deriving a control voltage variable in magnitude in accordance with the two relative rates; means for combining said two variable magnitude control voltages to obtain a resultant voltage; and means controlled by the resultant voltage from said combining means for operating said motor means to an extent varying with the magnitude of the resultant voltage.

References Cited in the file of this patent

UNITED STATES PATENTS

| 2,401,168 | Kronenberger | May 28, 1946 |
| 2,464,629 | Young | Mar. 15, 1949 |
| 2,555,209 | Vacquier | May 29, 1951 |
| 2,586,817 | Harris, Jr. | Feb. 26, 1952 |
| 2,591,938 | Holliday | Apr. 8, 1952 |
| 2,617,615 | Von Eschen | Nov. 11, 1952 |
| 2,638,288 | Hanna | May 12, 1953 |

FOREIGN PATENTS

| 812,451 | France | May 11, 1937 |
| 489,271 | Great Britain | Jan. 22, 1938 |